United States Patent
Sweeney

[15] 3,664,368
[45] May 23, 1972

[54] PCV VALVE

[72] Inventor: Frank B. Sweeney, Rochester, N.Y.
[73] Assignee: Emcon Technology, Inc., Rochester, N.Y.
[22] Filed: May 10, 1971
[21] Appl. No.: 141,788

Related U.S. Application Data

[63] Continuation-in-part of Ser. No. 799,798, Feb. 17, 1969, abandoned.

[52] U.S. Cl..........................137/480, 137/517, 137/539.5, 137/542, 123/119
[51] Int. Cl......................................................F16k 17/04
[58] Field of Search...............137/479, 480, 517, 519.5, 539, 137/539.5, 542, 543, 543.13, 498; 123/119 B; 251/363

[56] References Cited

UNITED STATES PATENTS

| | | | |
|---|---|---|---|
| 1,290,014 | 12/1918 | Patterson | 137/480 |
| 2,853,098 | 9/1958 | Fritzsche | 137/517 |
| 3,106,226 | 10/1963 | Machen | 137/517 X |
| 3,359,961 | 12/1967 | DePaolo | 137/480 X |

Primary Examiner—Harold W. Weakley
Attorney—Cumpston, Shaw & Stephens

[57] ABSTRACT

A PCV valve has a moving part with a stem guided in a bearing and a spherical head moving coaxially in a shaped orifice having a seat toward which the head is biased by a compression spring. The head is positioned axially in the orifice under the influence of intake manifold vacuum, and the orifice is preferably shaped for the desired valve opening at different engine operating conditions.

4 Claims, 7 Drawing Figures

INVENTOR
FRANK B. SWEENEY

ATTORNEY

INVENTOR
FRANK B. SWEENEY
ATTORNEY

PCV VALVE

RELATED APPLICATIONS

This application is a continuation-in-part of my copending parent application, Ser. No. 799, 798, filed Feb. 17, 1969, entitled, PCV VALVE, and abandoned upon the filing of this application.

THE INVENTIVE IMPROVEMENT

Positive crankcase ventilation (PCV) valves are commonly used to regulate the opening in passageways from the crankcase of an internal combustion engine to the lower pressure region of the intake manifold for drawing blowby fumes from the crankcase back into the engine and preventing their escape to the atmosphere. Such crankcase ventilation must meet standards for air-pollution control, and must be compatible with engine and carburetor requirements. PCV valves in such ventilation lines have evolved to meet such requirements.

Present PCV valves have to be replaced after a relatively short period of use because they become clogged and inoperative, and because they wear out in use. Present PCV valves use a moving valve part that is loosely held in a sealed casing under the bias of a spring, and has a shaped stem that changes the opening of a fixed orifice around the stem as the valve part moves axially within the body. Although many variations on such valves have been proposed, PCV valves sold today all follow this same general pattern.

The inventive PCV valve takes an opposite approach. Instead of a moving valve part that is loose to bang against casing surfaces in operation, the inventive PCV valve uses a moving valve part having a stem guided in a bearing to keep the valve part on the axis of the valve and out of contact with metering surfaces. Also, instead of a shaped stem moving axially in a fixed orifice, the inventive PCV valve uses a spherical head responsive to manifold vacuum for moving axially in an orifice that is preferably shaped to regulate the valve opening. This is not only a reversal of the usual arrangement, but it cooperates with the stem guiding feature to allow the inventive valve to be made economically of inexpensive material and still enjoy a longer life. Furthermore, the orifice part is screwed to the body of the valve so that the valve is easily opened for cleaning and need not be thrown away after a short period of use. This also makes the valve more versatile because it can be adapted for a wide variety of engines by merely screwing different orifices to the valve body, and variations in hose sizes and connections, straight or elbow bodies, etc., are more easily accommodated. Thus, many practical advantages following in making a sharp departure from the continuous evolutionary line leading to present PCV valves.

SUMMARY OF THE INVENTION

The inventive PCV valve includes: a hollow body having a hollow, cylindrical bearing surface and an outlet communicating with the hollow interior; a movable valve part having a cylindrical stem closely fitting the bearing surface for sliding motion and a spherical head with a larger diameter than the stem; an orifice part screwed to the body and having an orifice coaxial with the valve part, the orifice including a seat for receiving the spherical head to close the orifice and a metering portion on the outlet side of the seat for regulating the valve opening; and a compression spring engaging the body and the head for biasing the head to a position closely spaced from the seat.

DRAWINGS

DETAILED DESCRIPTION

Figure 1:
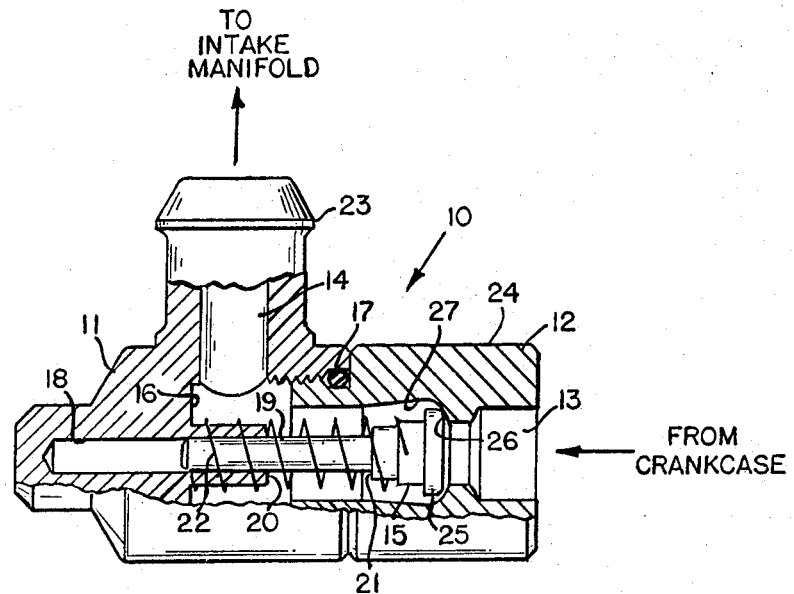
FIG. 1 is a partially cut-away, elevational view of a preferred form of the inventive PCV valve.

The PCV valve 10 of FIG. 1 includes a hollow body 11 and an orifice part 12 providing an inlet passageway 13 and an outlet passageway 14, with a movable valve part 15 regulating the flow through passageways 13 and 14. Blowby gasses from an engine crankcase enter inlet passageway 13 and pass out through outlet 14 to the intake manifold of the engine. Valve part 15 is positioned axially under the influence of manifold vacuum exerted in outlet passageway 14. Valve 10 can be oriented in any convenient position and need not be mounted in the horizontal position illustrated.

Body 11 is an elbow or right angle construction with outlet 14 normal to inlet 13. Body 11 has a hollow interior 16 communicating with outlet 14 and receiving orifice part 12 which is screwed to body 11 and sealed with O-ring 17. Body 11 is preferably injection-molded of plastic or die cast of metal.

Body 11 is formed with a hollow, cylindrical bearing sleeve or surface 18 that receives and guides the stem 19 of movable valve part 15. Stem 19 fits closely within cylindrical bearing surface 18 for free sliding motion in bearing 18 to maintain valve part 15 coaxial with the orifice in part 12. The forward edge of bearing surface 18 is formed as a stop surface 20 that engages collar 21 on valve part 15 to limit the opening motion of valve part 15. Valve part 15 has a head 25 with a diameter larger than stem 19 for responding to manifold vacuum and regulating the flow of gasses through valve 10. A compression spring 22 engages body 11 and head 25 to bias valve part 15 toward closure.

Orifice part 12 includes a seat 26 for receiving head 25 of valve part 15. Preferably, spring 22 does not force head 25 tight against seat 26 for closing completely the passageway through valve 10, but head 25 and seat 26 are respectively configured for a shutoff engagement whenever head 25 is forced against seat 26 by a backfire increasing the pressure in outlet 14. The inside diameter of inlet passageway 13 at seat 26 is less than the diameter of head 25 to accomplish this.

On the outlet side of seat 26, passageway 13 is preferably formed with a shaped orifice 27 that curves outward to an internal diameter substantially larger than the diameter of head 25 and then tapers inward in the direction of flow to an internal diameter slightly larger than the diameter of head 25. The shape of orifice 27 determines the flow characteristics of the valve, but orifice 27 can have other curves and tapers or can be a uniform-diameter, cylindrical bore depending on the needs of the engine and carburetor. When collar 21 is seated against stop surface 20 for maximum travel of valve part 15 from seat 26, the internal diameter of orifice 27 at the position of head 25 is slightly larger than the diameter of head 25 so that some blowby gasses can pass through valve 10.

With a dead engine, valve part 15 has its head 25 near seat 26 as illustrated in FIG. 1. When the engine is started and is idling, manifold vacuum exerted in outlet passageway 14 is very high and draws valve part 15 far from seat 26 to the limit position with collar 21 engaging stop surface 20. This provides a small passageway through valve 10 for blowby gases. At higher engine speeds and loading conditions, head 25 is positioned at various axial positions between seat 26 and the idle limit position for opening valve 10 to various rates of flow. Orifice 27 is given the appropriate shape to allow the desired flow for each such engine operating condition. Such flow conditions are determined by engine and carburetor needs and are generally known in the engine arts. Also, the circulation path for the crankcase ventilation system and the placement of the PCV valve affect such flow considerations. Those skilled in the art will understand what adjustments to make in the curvature and taper of orifice surface 27 to achieve the desired flow results.

Since valve part 15 is maintained coaxially with orifice 27 by the guiding of stem 19 in bearing surface 18, head 25 does not contact orifice surface 27 to cause any wear of the valve. This means that interior metering surfaces need not be made of hardened metal and do not wear in use. Also, body 11 and orifice part 12 can be injection-molded or cast of plastic or relatively soft metal or economical construction because their internal surfaces need not be wear-resistant. Furthermore, the inventive arrangement uses smooth walled passageways and leaves plenty of space around moving parts so the valve interior stays cleaner in use.

Figure 2:
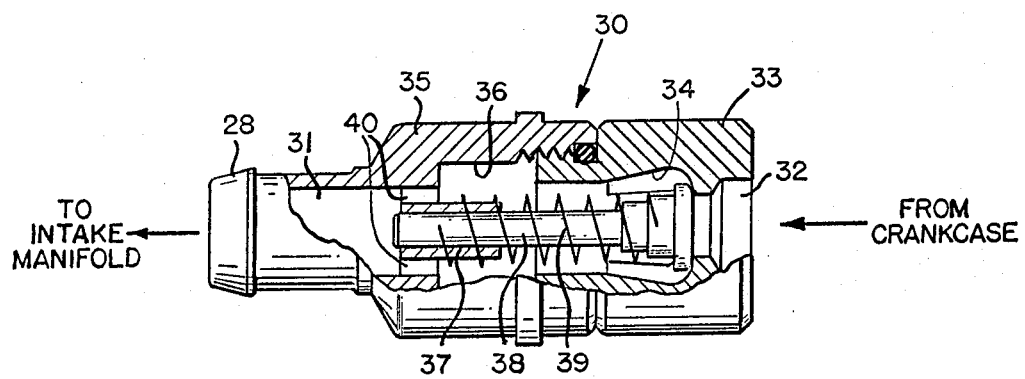
FIGS. 2 and 3 are partially cut-away elevational views of alternative preferred embodiments of the inventive PCV valve.

PCV valve 30 of FIG. 2 has an outlet 31 coaxial with inlet 32. Orifice part 33 can be identical with orifice part 12 of valve 10, or can have a differently shaped metering orifice 34 to meet different engine and carburetor demands or a different exterior shape for hose connections.

Body 35 has a hollow interior 36 and is preferably injection-molded of plastic material to form outlet passageway 31 and bearing surface 37 to receive movable valve part 38. Valve part 38 is positioned coaxially in orifice 34 under the bias of spring 39 in the same manner as described above for valve 10. Openings 40 formed around bearing sleeve 37 allow gasses to pass through body 35 and outlet 31.

Figure 3:
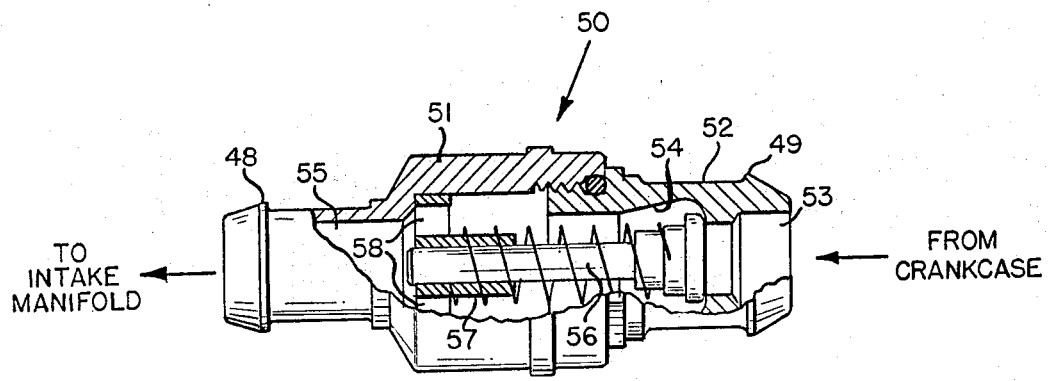

PCV valve 50 of FIG. 3 has a body 51 and an orifice part 52 providing an inlet 53, a metering passageway 54, and an outlet passageway 55. Valve part 56 moves coaxially in metering orifice 54 as guided by bearing insert 57 that is separately made and pressed into body 51 and includes openings 58 to allow passage of gasses through body 51 to outlet 55. The operation of valve 50 is similar to the operation of valves 10 and 30 described above.

Figure 4:
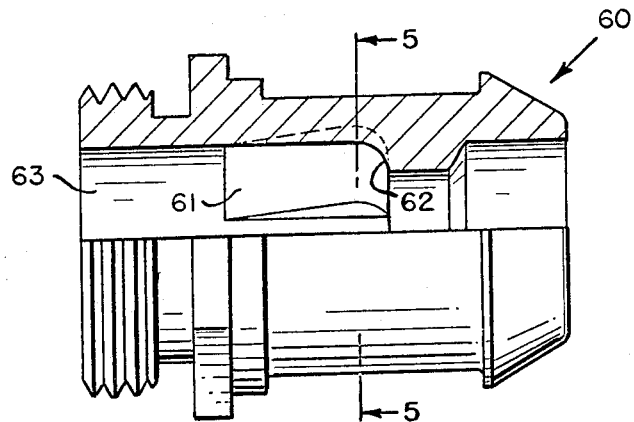
FIG. 4 is a partially cut-away elevational view of an orifice part for the inventive PCV valve.
Figure 5:
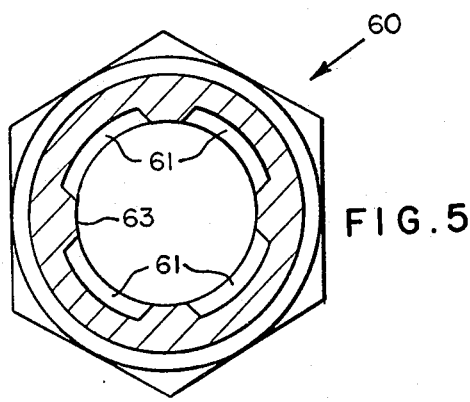
FIG. 5 is a cross-sectional view of the orifice part of FIG. 4 taken along the line 5—5 thereof.

FIGS. 4 and 5 show an alternative construction of an orifice part 60 in which segments 61 of the surfaces of the metering orifice on the outlet side of seat 62 are formed with an inside diameter larger than surfaces 63 separating segments 61. This arrangement accommodates molding operations in which expansible mold parts extend outward to form surfaces 61 and are retracted inward for withdrawing from part 60. The volume and depth set by surfaces 61 relative to surfaces 63 determines the desired flow through the orifice. Of course, different numbers of segments can be used to suit the convenience of the molding operation. Also, when the orifice shape is not formed by molding or casting, the desired taper and curvature is preferably machined into the orifice part by a cutting tool giving the orifice a circular opening of variable diameter. Such orifices are shown in valves 10, 30, and 50.

As the drawings illustrate, the external surfaces of valves 10, 30, and 50 are variously shaped for fitting the insides of hoses or other connectors. Such external surfaces can have collars 23 (FIG. 1), 28 (FIG. 2), 48 or 49 (FIG. 3), of various diameters for fitting inside hoses, or can be screw-threaded or have a smooth external surface 24 (FIG. 1) for accommodating existing connections in crankcase ventilation systems. The flow characteristics of the inventive PCV valves can be changed by merely substituting different orifice parts 12, 33, or 52, having different shaped metering orifice passageways to accommodate the different needs of various engines and carburetors.

Since the bodies and orifice parts of the inventive PCV valve are screwed together, it is simple and feasible to unscrew and separate these parts for cleaning of the valve. The valve body with its outlet passageway can be left connected to its hose or pipe, and merely by disconnecting the inlet hose and unscrewing the orifice part, the head of the valve port and the orifice can be cleaned, and the valve reassembled for further operation. The valve is designed so it cannot be assembled incorrectly, and such cleaning operation is relatively foolproof.

The seating of the head of the movable valve part against the seat in the orifice part assures that any backfire raising the pressure in the outlet passageway closes the valve and prevents backfire flame from passing through the inlet passageway to the engine crankcase where it might explode the engine.

Figure 6:
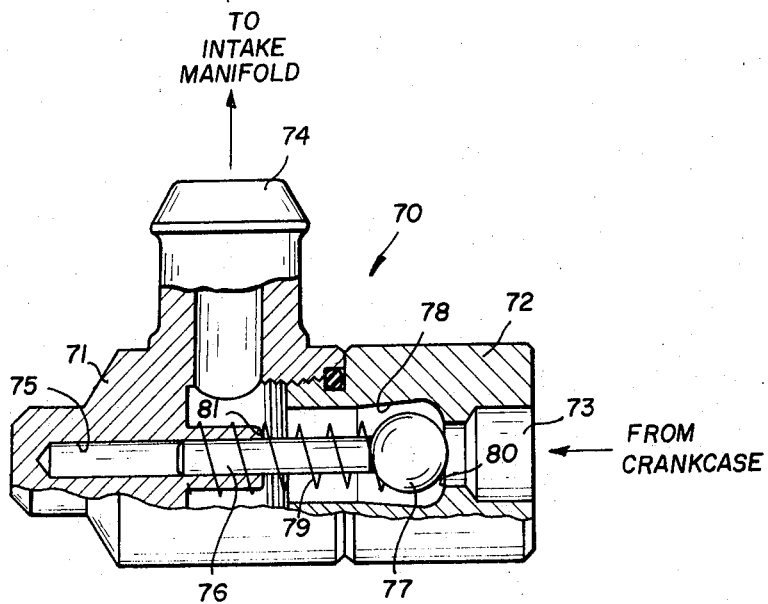
FIG. 6 is a partially cut-away, elevational view of another preferred embodiment of the inventive PCV valve.
Figure 7:
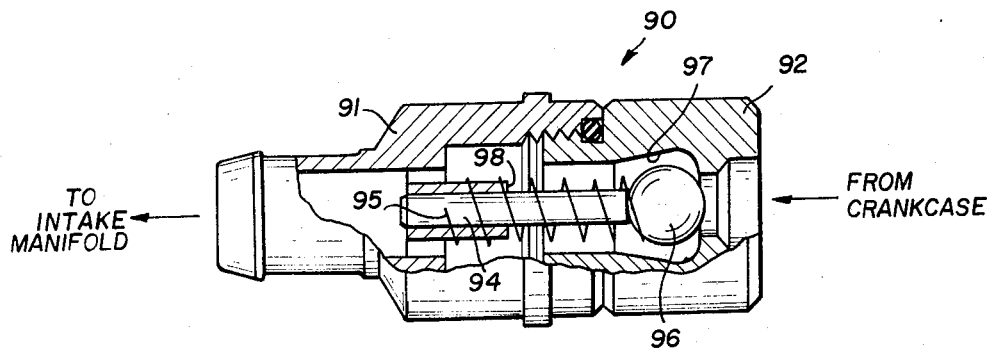
FIG. 7 is a partially cut-away, elevational view of another preferred form of the inventive PCV valve.

After the parent application was filed covering the valves shown in FIGS. 1 – 5, applicant experimented extensively with PCV valves and developed a further improvement shown in FIGS. 6 and 7. One of the experiments was to omit the valve stem entirely and use a ball bearing as the movable valve part. The ball bearing was loosely seated in the final turn of a compression spring to move freely along the metering orifice in response to manifold vacuum. The ball created the right sort of turbulence in the flow of gasses through the valve so that the valve stayed relatively clean. Also, the freedom of movement of the ball within the metering orifice and inside the final turn of the compression spring seemed to contribute to keeping the interior of the valve clean. However, the vibrational contact of the ball against the metering orifice passageway made the valve wear rapidly.

Continuing the experimentation, a spherical ball bearing was then mounted on a guided valve stem to see if the self-cleaning capacity of the spherical body would be preserved when its freedom of motion was limited. Surprisingly, this proved to be true, and a stem-guided valve part with a spherical head achieved self-cleaning and long-wear life advantages over both the valves of FIGS. 1 – 3 and the loose, spherical ball embodiment. This improvement is described below in reference to FIGS. 6 and 7.

Valve 70 of FIG. 6 is similar to valve 10 of FIG. 1 in having a body 71 and an orifice part 72 screw threaded together to provide an inlet 73 and an outlet 74. A bearing sleeve 75 supports valve stem 76 for free sliding motion axially of the valve, and valve 70 differs from valve 10 in that a spherical ball 77 is mounted on stem 76 for movement axially inside of shaped interior passageway 78. A compression spring 79 surrounds bearing sleeve 75 and stem 76, and engages body 11 and spherical head 77 to bias spherical head 77 to the illustrated position where it is closely spaced from shutoff seat 80. The end of bearing sleeve 75 forms a stop surface 81 limiting the travel of ball 77, and stem 76 holds sphere 77 out of contact with interior surface 78 as sphere 77 moves axially of valve 70.

The operation of valve 70 is similar to the operation of valve 10 except that spherical head 77 causes a turbulence in the gasseous flow that results in cleaner operation for a longer time before the interior of valve 70 becomes clogged. The full explanation for the self-cleaning effect of spherical head 77 is not known, but this result has been clearly demonstrated in practice.

Valve 90 of FIG. 7 is similar to valve 30 of FIG. 2 in having a body 91 and an orifice part 92 screw threaded together. Bearing sleeve 93, stop surface 98, valve stem 94, and compression spring 95 are all similar to previously described valves, and valve 90 differs in having a spherical head 96 mounted on stem 94 for movement axially out of contact with interior passageway 97. Valve 90 operates similarly to valves 10, 30, and 50.

The spherical heads 77 and 96 of valves 70 and 90 preferably replace the moving valve parts in previously described valves, and preferably operate in the same general manner with improved cleanliness. The shape variations of interior metering passageways and other characteristics of the inventive valve are preferably the same, and the previously described advantages of separately formed orifice parts, ease of mounting and disassembly for cleaning, and longevity from lack of vibrational contact between parts, all remain true.

Persons wishing to practice the invention should remember that other embodiments and variations can be adapted to particular circumstances. Even though one point of view is necessarily chosen in describing and claiming the invention, this should not inhibit broader or related applications within the spirit of the invention. For example, many shapes and sizes of parts are possible, and different materials and construction techniques can be used within the scope of the invention.

I claim:
1. A PCV valve comprising:
   a. a hollow body having an outlet;
   b. an orifice part secured to said body to form an inlet opening;

c. said orifice part having a shaped interior surface leading inward from said inlet opening;
d. a bearing sleeve in said body;
e. a valve stem having a sliding fit in said bearing sleeve;
f. a spherical head mounted on said stem to move axially of said interior surface without contacting said interior surface;
g. said spherical head having a diameter substantially larger than said stem and somewhat smaller than the minimum inside diameter of said interior surface;
h. said orifice part having a shutoff seat engagable by said spherical head for shutting off said valve against reverse flow;
i. a compression spring surrounding said stem and engaging said body and said spherical head for biasing said spherical head to a position closely spaced from said shutoff seat; and
j. said shaped interior surface having an outward flare on the outlet side of said shutoff seat to form a substantial opening around said spherical head at said closely spaced position and then an inward taper in the direction of flow to form a progressively smaller opening around said spherical head as said spherical head moves against said spring.

2. The PCV valve of claim 1 wherein a stop surface limits the movement of said spherical head away from said shutoff seat.

3. The PCV valve of claim 2 wherein said interior surface forms a minimum opening around said spherical head when said spherical head is at said limit of movement.

4. The PCV valve of claim 3 wherein said body and said orifice part are screw threaded together, and the external surfaces of said valve are shaped for seating inside hoses.

* * * * *